Patented Oct. 4, 1932

1,880,505

UNITED STATES PATENT OFFICE

ALBERT KELVIN SMITH, OF SHAKER HEIGHTS, OHIO, ASSIGNOR TO THE DOW CHEMICAL COMPANY, OF MIDLAND, MICHIGAN, A CORPORATION OF MICHIGAN

METHOD OF PREPARING MAGNESIUM CHLORIDE FROM A BASIC CHLORIDE THEREOF

No Drawing.  Application filed May 6, 1929.  Serial No. 361,014.

The present invention relates, as indicated, to the preparation of magnesium chloride from a basic chloride thereof, specifically to such preparation by the reaction of hydrochloric acid gas upon such basic salt to form either a hydrated magnesium chloride or the like anhydrous chloride.

I have discovered that basic chloride of magnesium will react with hydrochloric acid gas to produce magnesium chloride and water, according to equation (1) or (2), viz:

(1) $MgOHCl + HCl \rightarrow MgCl_2.H_2O$
(2) $MgOHCl + HCl \rightarrow MgCl_2 + H_2O$ (vapor)

Which result will be effective, I find, depends upon the conditions under which the reaction is carried out as hereinafter fully explained.

To the accomplishment of the foregoing and related ends, the invention, then, consists of the method hereinafter fully described and particularly pointed out in the claims, the following description setting forth in detail several modes of carrying out the invention, such disclosed modes illustrating, however, but several of various ways in which the principle of the invention may be used.

In the preparation of the lower hydrated forms of magnesium chloride, e. g. $MgCl_2.2H_2O$, $MgCl_2.H_2O$ and the anhydrous form, by dehydration of a hydrated salt in a current of hot inert gas, such as air or the products of combustion of fuel, decomposition occurs with the formation of HCl gas and a basic magnesium compound usually estimated as MgO and referred to as such. I have found that such basic compound is a basic chloride of magnesium, which is present as a decomposition product in such so called air dried chloride in increasing amount as the dehydration proceeds, but little forming in the transition from hexa- to tetrahydrate, more in the transition from tetra- to dihydrate, a still larger addition resulting in the transition from the di- to monohydrate, and even more in the transition from the monohydrate to the anhydrous chloride. I find that the so called "end product" resulting from air drying until even at a temperature above 300° C. no more water as such is evolved, although comprised chiefly of anhydrous magnesium chloride, still contains hydrogen and oxygen which appear to be combined in the same molecule with $MgCl_2$ to form a basic chloride corresponding to the formula MgOHCl.

One derivation may be written thus:—

$$MgCl_2.H_2O \rightarrow MgOHCl + HCl$$

Such basic compound is, as stated, doubtless present as a component of the hydrated salt being dried before all of the water has been removed or before the evolution of water from the salt has ceased. It is unnecessary when so preparing "end product" for use in my process that such preparation shall proceed to the point at which no more water, as such, is present or may be evolved by further heating, my method being concerned with the reaction of HCl upon a basic magnesium chloride whether as such accompanied by magnesium chloride either in partially dehydrated or anhydrous form.

My invention is conceived further, as applicable to the conversion similarly of basic magnesium chloride, derived from any source, to magnesium chloride.

In practicing my invention, the mode will vary with the nature of product desired, i. e., whether a lower hydrated chloride as derived in reaction (1) above, is desired, or the anhydrous chloride as derived in reaction (2) is wanted.

HCl gas will react with the basic chloride at practically all temperatures, more rapidly at high temperatures, to produce magnesium chloride and water. The latter will either combine with the resulting $MgCl_2$ to form a hydrate thereof, or will be evolved as vapor.

If the oxychloride be treated in a closed vessel by admitting HCl gas thereto, at a pressure in excess of the total dissociation pressure of the hydrated chloride formable, the water formed will remain as crystal water of such chloride, but if such treatment and absorption be conducted at a pressure below such total dissociation pressure, the water formed will be evolved as vapor.

In order to remove the evolved vapor, venting must be done and more substantially dry HCl gas admitted, which replaces the moisture laden atmosphere in contact with the chloride with dry HCl gas. Such treatment is attained conveniently in a continuous system wherein a current of the basic salt or of magnesium chloride containing a component of the basic salt, is contacted with a current of the HCl gas or an aeroform current containing the HCl gas.

The pressures which must be exceeded at various temperatures in order that the water formed may be retained by the magnesium chloride as crystal water thereof are shown in the following table in which are listed opposite various temperatures from 190° C. to 280° C. inclusive, the partial HCl, water vapor, and total dissociation pressures of $MgCl_2.H_2O$ and in the last column the molecular ratio of $HCl/H_2O$ in the atmosphere in equilibrium with such hydrated chloride at the stated temperatures.

*Dissociation pressures of $MgCl_2.H_2O$*

| Temperature degrees centigrade | Partial pressure HCl in mm. of Hg | Partial pressure $H_2O$ in mm. of Hg | Total dissociation pressure in mm. of Hg | Molecular ratio $HCl/H_2O$ |
| --- | --- | --- | --- | --- |
| 190 | 21.5 | 9.2 | 30.7 | 2.34 |
| 200 | 31.5 | 13.5 | 45.0 | 2.33 |
| 210 | 46.0 | 19.5 | 65.5 | 2.36 |
| 220 | 67.0 | 28.5 | 95.5 | 2.35 |
| 230 | 95.0 | 41.0 | 136.0 | 2.32 |
| 240 | 138.0 | 58.0 | 196.0 | 2.38 |
| 250 | 198.0 | 83.0 | 281.0 | 2.38 |
| 260 | 278.0 | 116.0 | 394.0 | 2.39 |
| 270 | 380.0 | 165.0 | 520.0 | 2.30 |
| 280 | 520.0 | 230.0 | 750.0 | 2.26 |
| Average ratio | | | | 2.34 |

In the carrying out of my improved process the "end product" containing the basic salt or the basic salt as such, or basic salt from any source whether accompanied by other material or not will be charged into a suitable vessel, into which substantially dry HCl gas may be passed.

Under pressure conditions in excess of the tabular values of total dissociation pressure at the corresponding temperatures, reaction (1) will proceed by absorption of the HCl supplied with formation of $MgCl_2.H_2O$.

Under pressure conditions below the tabular values at the corresponding temperatures, reaction (2) will be in effect and will continue until the $H_2O$ vapor produced reduces the $HCl/H_2O$ molecular ratio to the equilibrium value shown in the table. The reaction may be continued further by withdrawing the HCl atmosphere with its burden of water vapor produced in the reaction and supplying more dry HCl gas. Under such conditions, employing a current of substantially dry HCl gas, reaction (2) may be carried to completion and a product obtained comprising anhydrous magnesium chloride substantially or entirely free of basic chloride and contaminated only with unchanged impurities or product of same, such as NaCl accompanying the raw materials.

The reactions will be facilitated in both instances by employing a divided form of basic salt, such as a granular or flaked form thereof, carrying out the treatment in a manner adapted to bring the solid and gaseous phases into intimate contact, as by agitation or stirring, preferably of shallow layers of the chloride.

Reaction (1) is exothermic and may take place at low temperatures. Reaction (2) is, however, endothermic and will be better facilitated by working continuously in countercurrent in a suitable vessel in which the chloride may be rolled over, or otherwise stirred to permit removal of water vapor in the gas stream and to contact the nearly finished material with the incoming dry gas. Other things being equal, the rate of reaction increases rapidly with the temperature of contacting HCl and basic chloride.

It should be noted that the total dissociation pressure reaches atmospheric pressure between 280° and 290° C. so that attempts to heat the salt to a higher temperature when operating at atmospheric pressure may not increase the temperature thereof, but will increase the rate of heat input and of the diffusion of gases into and out of the solid particles of salt, thereby increasing the rate of working.

Another facilitating condition is the size and porosity of the salt particles. Since the HCl gas must reach the cores of the solid particles, and $H_2O$ vapor must be removed therefrom, large sized or non-porous particles require longer treatment than do small sized or porous particles.

Presence of air or other inert gas inhibits diffusion of the dry HCl into the cores, and of the moisture laden gas out of the particles. A strong HCl gas, therefore, facilitates or increases the rate of working. As shown in the table above, the HCl gas becomes 100 per cent saturated with water vapor with respect to reaction (2) when the molecular ratio of $HCl/H_2O$ rises to approximately 2.34, said ratio being practically constant throughout the temperature range therein stated. Speed of reaction is thus a function of the $HCl/H_2O$ ratio in the exit gases. The greater this ratio the higher the drying head and the more rapid the rate of the reaction.

I have found, in practice of my method for the purpose of preparing the anhydrous chloride from the oxychloride, that such end may be readily attained by passing a current of the salt to be reacted, specifically a current of air dried hydrated chloride, containing the basic salt as a decomposition component thereof, through an elongated tube surrounded by a jacket of flowing furnace gases of controlled volume and temperature, said salt being forwarded through said tube while being stirred by a suitable spiral conveyer, against a current of substantially dry hydrochloric acid gas. The temperature of the heating gas was maintained substantially constant throughout its contact with the tube at a range approximately 335° to 350° C. By controlling the rate of gas supply, relative to the salt current volume or weight, a practically saturated exit gas was obtained, i. e., one having the HCl/H₂O ratio as stated in the table. A practically anhydrous magnesium chloride product resulted.

I am aware that Collings and Gann have disclosed in U. S. Patent No. 1,479,982, a method of dehydrating magnesium chloride containing water of crystallization in an atmosphere of hydrochloric acid gas, said gas being circulated in a closed circuit through the dryer in which the chloride is being dehydrated, thereafter through a dehumidifier for the gas and thence again to the chloride drying step. Such disclosure and method are, however, concerned with the removal of crystal water and are not concerned with the production of anhydrous magnesium chloride from the so called "end product" hereinbefore referred to or from the basic magnesium oxychloride of such "end product", or from a basic magnesium chloride.

I am also aware that Ashcroft has disclosed in U. S. Patent No. 1,359,652 a method of producing anhydrous magnesium chloride using a slow current of hydrochloric acid gas, but his method is likewise concerned only with the removal thereby of water of crystallization.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of increasing the magnesium chloride content of air-dried magnesium chloride containing a component of basic chloride which comprises heating such air-dried chloride in the form of small particles in an atmosphere of hydrochloric acid at a temperature not greatly exceeding 290° C.

2. The method of converting basic magnesium chloride to magnesium chloride containing not more than one molecule of water of crystallization which comprises heating such basic chloride in the form of small particles in an atmosphere of hydrochloric acid at a temperature not greatly exceeding 290° C.

3. The method of making anhydrous magnesium chloride which comprises heating basic magnesium chloride in the form of small particles in an atmosphere of hydrochloric acid at a temperature not greatly exceeding 290° C. while maintaining the molecular ratio of HCl/H₂O in such atmosphere at a value greater than 2.34.

4. The method of making anhydrous magnesium chloride which comprises heating air-dried magnesium chloride containing a component of basic chloride in the form of small particles in an atmosphere of hydrochloric acid at a temperature not greatly exceeding 290° C. while maintaining the molecular ratio of HCl/H₂O in such atmosphere at a value greater than 2.34.

5. The method of making anhydrous magnesium chloride which comprises forwarding a body of a solid subdivided form of basic magnesium chloride in countercurrent to a current of hydrochloric acid gas at a temperature sufficient to remove water from such salt but not greatly exceeding 290° C.

6. The method of making anhydrous magnesium chloride which comprises forwarding a body of a solid subdivided form of air-dried magnesium chloride containing a component of basic chloride in countercurrent to a current of hydrochloric acid gas at a temperature sufficient to remove water from such salt but not greatly exceeding 290° C.

Signed by me this 4th day of May, 1929.

ALBERT KELVIN SMITH.